United States Patent
Rimon et al.

(10) Patent No.: US 9,123,335 B2
(45) Date of Patent: Sep. 1, 2015

(54) SYSTEM APPARATUS CIRCUIT METHOD AND ASSOCIATED COMPUTER EXECUTABLE CODE FOR NATURAL LANGUAGE UNDERSTANDING AND SEMANTIC CONTENT DISCOVERY

(71) Applicant: JINNI MEDIA LTD., Rosh Ha'ayin (IL)

(72) Inventors: Mordechai Mori Rimon, Jerusalem (IL); Ram Meshulam, Yavne (IL); Izhak Ben Zaken, Shimshit (IL)

(73) Assignee: JINNI MEDIA LIMITED, Rosh Ha-Ayin (IL)

( * ) Notice: Subject to any disclaimer, the term of this patent is extended or adjusted under 35 U.S.C. 154(b) by 229 days.

(21) Appl. No.: 13/771,705

(22) Filed: Feb. 20, 2013

(65) Prior Publication Data

US 2014/0236572 A1 Aug. 21, 2014

(51) Int. Cl.
*G10L 15/18* (2013.01)
*G06F 17/27* (2006.01)
*G10L 15/22* (2006.01)
*G01L 17/00* (2006.01)
*G10L 25/54* (2013.01)

(52) U.S. Cl.
CPC ............... *G10L 15/18* (2013.01); *G01L 17/00* (2013.01); *G06F 17/271* (2013.01); *G06F 17/2785* (2013.01); *G10L 15/1815* (2013.01); *G10L 25/54* (2013.01); *G10L 2015/227* (2013.01)

(58) Field of Classification Search
None
See application file for complete search history.

(56) References Cited

U.S. PATENT DOCUMENTS

| | | | | |
|---|---|---|---|---|
| 5,237,502 A | * | 8/1993 | White et al. | 704/1 |
| 5,832,435 A | * | 11/1998 | Silverman | 704/260 |
| 6,266,649 B1 | | 7/2001 | Linden et al. | |
| 7,660,815 B1 | | 2/2010 | Scofield et al. | |
| 7,668,910 B2 | | 2/2010 | Dinges et al. | |
| 7,921,069 B2 | | 4/2011 | Canny et al. | |
| 8,255,458 B2 | | 8/2012 | Cohen et al. | |
| 2002/0052873 A1 | | 5/2002 | Delgado et al. | |
| 2004/0034652 A1 | | 2/2004 | Hofmann et al. | |
| 2004/0078190 A1 | * | 4/2004 | Fass et al. | 704/7 |
| 2005/0065773 A1 | | 3/2005 | Huang et al. | |

(Continued)

FOREIGN PATENT DOCUMENTS

| | | |
|---|---|---|
| WO | 2012110690 | 8/2012 |
| WO | 2013013091 | 1/2013 |

OTHER PUBLICATIONS

Masthoff. "Group recommender systems: Combining individual models." In: Recommender Systems Handbook. 2011.

(Continued)

*Primary Examiner* — Jeremiah Bryar
(74) *Attorney, Agent, or Firm* — Vladimir Sherman; Professional Patent Solutions

(57) ABSTRACT

Disclosed are systems, apparatuses, circuits and methods for extrapolating meaning from vocalized speech or otherwise obtained text. Speech of a speaking user is sampled and digitized, the digitized speech is converted into a text stream, the text stream derived from speech or otherwise obtained is analyzed syntactically and semantically, a knowledgebase in the specific context domain of the text stream is utilized to construct one or more semantic/syntactic domain specific query analysis constrains/rule-sets, and a "Domain Specific Knowledgebase Query" (DSKQ) or set of queries is built at least partially based on the domain specific query analysis constrains/rule-sets.

20 Claims, 8 Drawing Sheets

(56) References Cited

U.S. PATENT DOCUMENTS

| | | |
|---|---|---|
| 2006/0149558 A1 | 7/2006 | Kahn et al. |
| 2006/0288015 A1 | 12/2006 | Schirripa et al. |
| 2007/0250901 A1 | 10/2007 | McIntire et al. |
| 2008/0086311 A1 | 4/2008 | Conwell et al. |
| 2008/0133228 A1 | 6/2008 | Rao |
| 2008/0167875 A1* | 7/2008 | Bakis et al. .......... 704/258 |
| 2008/0294607 A1 | 11/2008 | Partovi et al. |
| 2009/0228264 A1 | 9/2009 | Williams et al. |
| 2010/0138271 A1 | 6/2010 | Henkin et al. |
| 2011/0093271 A1* | 4/2011 | Bernard ............... 704/257 |
| 2011/0320191 A1* | 12/2011 | Makeyev ............... 704/9 |
| 2012/0036137 A1 | 2/2012 | Naidu et al. |
| 2012/0109739 A1 | 5/2012 | Gupta |
| 2013/0085866 A1 | 4/2013 | Levitis et al. |
| 2013/0238419 A1 | 9/2013 | Glick et al. |
| 2013/0238710 A1 | 9/2013 | Meshulam et al. |
| 2014/0172501 A1 | 6/2014 | Meshulam et al. |
| 2014/0236572 A1 | 8/2014 | Meshulam et al. |

OTHER PUBLICATIONS

Yu et al. "TV program recommendation for multiple viewers based on user profile merging." In: User Modeling and User-Adapted Interaction 16.1. Jun. 10, 2006.

Adomavicius et al. "Toward the next generation of recommender systems: A survey of the state-of-the-art and possible extensions." In: IEEE Transactions on Knowledge and Data Engineering 17.6. Jun. 2005.

Jameson et al. "Recommendation to groups." In: The adaptive web. 2007.

Hung, Chia-Chuan, et al. "Tag-based user profiling for social media recommendation." (Workshop on Intelligent Techniques for Web Personalization & Recommender Systems at AAAI2008. vol. 45. 2008).

International Application PCT/IB2014/059066 International Search Report and Written Opinion of the International Searching Authority dated Aug. 4, 2014 (12 pages).

International Application PCT/IB2014/060526 International Search Report and Written Opinion of the International Searching Authority dated Sep. 15, 2014 (7 pages).

International Application PCT/IB2014/060521 International Search Report and Written Opinion of the International Searching Authority dated Sep. 15, 2014 (10 pages).

International Application PCT/IB2014/063889 International Search Report and Written Opinion of the International Searching Authority, date of mailing Feb. 24, 2015 (7 pages).

* cited by examiner

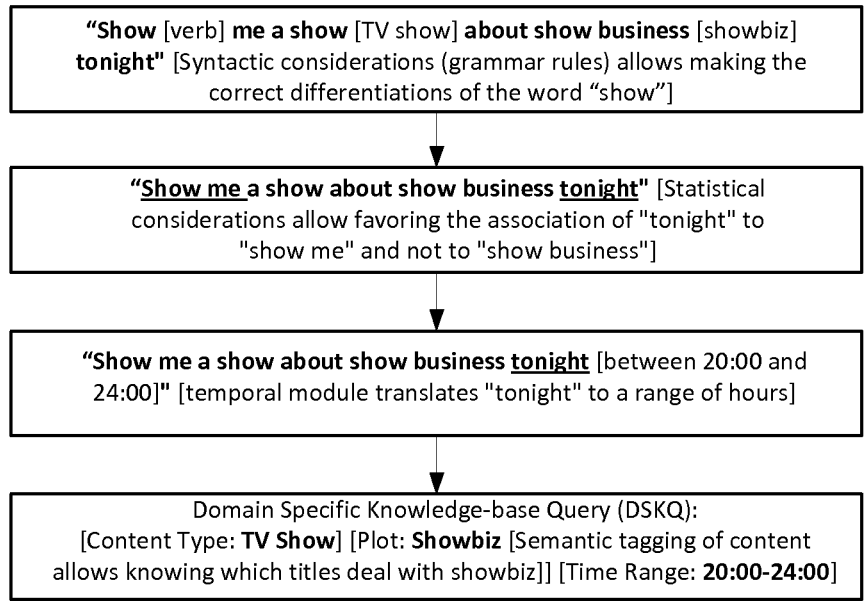
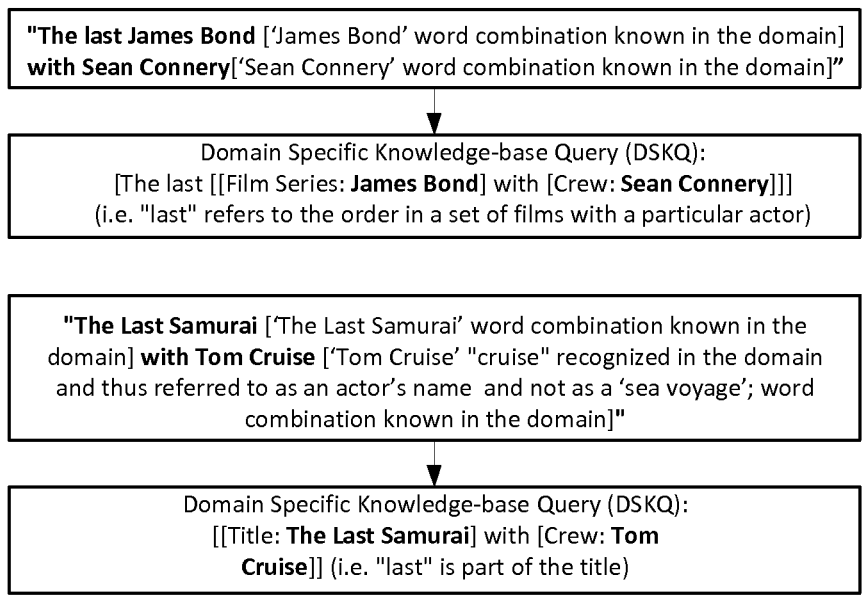

FIG. 3C  Domain Knowledge Based Parsing:
Complex Concepts

"Mind bending Victorian detective ["Victorian" and "Detective" in the text are translated to Boolean combinations of domain-specific genome terms] stories"

Domain Specific Knowledge-base Query (DSKQ):
[Plot: Private Detective OR Police Detective OR Amateur Detective [based on the term "detective"]] [Plot Time: 19th Century [based on the term "Victorian"]] [Plot Place: England [based on the term "Victorian"]] [Mood: Mind Bending]

FIG. 3D  Domain Knowledge Based Parsing:
Content Characteristics and Syntax

"Woody Allen's ['Woody Allen' word combination known in the domain] comedies [Identified as Genre type] but not [negation of result sets] like [syntactic identification of the role of "like" in the sentence (a preposition and not a verb or other parts of speech)] The purple rose of Cairo [syntactic identification of "Cairo" as part of a title and not as a place; content similarity/distance (to 'The purple rose of Cairo') function]

Domain Specific Knowledge-base Query (DSKQ):
[Genre: Comedy] [Crew: Woody Allen] [NEG [Similar: [Title: The Purple Rose of Cairo]]]

FIG. 3E  Prosody Information (tempo-spectral parameters) Assisted Parsing

A request for a movie which is "not [short pause] sentimental [long pause] and [short pause] humorous"

Interpreted as: [not sentimental] and [humorous]
rather than as: not [sentimental and humorous]

A request for "a good movie for me [stress on 'for me'] to watch on TV tonight"

Interpreted as: [ personal recommendations based on requester's taste profile]
rather than as: [a general request for a highly-rated content]

SYSTEM APPARATUS CIRCUIT METHOD AND ASSOCIATED COMPUTER EXECUTABLE CODE FOR NATURAL LANGUAGE UNDERSTANDING AND SEMANTIC CONTENT DISCOVERY

FIELD OF THE INVENTION

The present invention generally relates to the fields of Natural Language Processing (NLP) and Information Retrieval (IR). More specifically, the present invention relates to systems, apparatuses, circuits, methods and associated computer executable codes for Content Discovery and Multimedia Information Retrieval (MIR).

BACKGROUND

Our search for digital knowledge began several decades ago when the idea of digitizing media was commonplace, yet books were still the primary medium for storing knowledge. Before the field of multimedia information retrieval coalesced into a scientific community, there were many contributory advances from a wide set of established scientific fields. From a theoretical perspective, areas such as artificial intelligence, computational vision, pattern recognition and knowledge management contributed significantly to the underlying mathematical foundation of MIR. Psychology and related areas such as aesthetics and ergonomics provided basic foundations for the interaction with the user. Further, applications of pictorial search into a database of imagery already existed in niche forms; such as face recognition, robotic guidance, and character recognition. Applications of text retrieval associated with multimedia were largely based on keywords.

The two fundamental necessities for a multimedia information retrieval system are: (1) searching for a particular media item, and (2) browsing and summarizing a media collection. In searching for a particular media item, the current systems have significant limitations. No credible representative real-world test sets exist for evaluation, or even benchmarking measures, which are clearly correlated with user satisfaction. In general, current systems have not yet had significant impact on society, due to an inability to bridge the semantic gap between computers and humans.

Taking the above into account, there clearly remains a need, in the fields of Language Processing and Multimedia Information Retrieval, for systems apparatuses circuits methods and associated computer executable codes that introduce unique approaches to semantic understanding, such as an ability to understand domain-specific concepts, realized by a wide user vocabulary, transform non-structured natural speech or written text to structured queries (a task sometimes referred to as NLU or NLP) and estimate the user's satisfaction level resulting from the exposure to a particular media item(s).

SUMMARY OF THE INVENTION

Below are described a number of novel and innovative methods, circuits, apparatuses, systems and associated computer executable code for (natural) language processing of queries expressed in speech or in writing. According to some embodiments of the present invention, there is provided a language processing system for extrapolating meaning from vocalized speech, or otherwise provided free text or natural language, and discovering content, which system may comprise: (1) a Speech Acquisition Block (1) to sample and digitize vocalized speech of a user; (2) a Speech Analytics Block (2) to analyze the digitized speech, so as to recognize within the digitized speech samples a specific text stream; (3) a Domain Block (3) to utilize knowledgebases, in the context domain of the vocalized speech, or otherwise obtained text, to construct one or more semantic/syntactic domain specific query analysis constrains; and (4) a Natural Language Processing Block (4) to build, at least partially based on the domain specific query analysis constrains and/or general language syntax pertaining to requests, questions and instructions, a "Domain Specific Knowledgebase Query" (DSKQ) or set of queries. According to some embodiments, the language processing system may further comprise: (5) The Domain Block (3) to utilize knowledgebases, in the context domain of the vocalized speech, or otherwise obtained text, to construct one or more semantic domain specific discovery/recommendation constrains; and (6) a Data/Command Discovery Block (5) to find/select and output data/command(s)/content(s) at least partially based on: (a) the DSKQ(s), and/or (b) the semantic domain specific discovery/recommendation constrains.

According to some embodiments of the present invention, the system may further comprise: (7) a User Specific Data Block (6). The Speech Analytics Block (2) may identify the speaking user by referencing the User Specific Data Block (6) with digitized speech samples from the vocalized speech. According to some embodiments, the Data/Command Discovery Block (5), as part of selecting and outputting data/command(s)/content(s), may take into consideration prior preferences of the speaking user by referencing the User Specific Data Block (6) with the details of the identified speaking user. According to some embodiments of the present invention, the Speech Analytics Block (2) may derive Prosody information (e.g. tempo-spectral parameters) to assist the Natural Language Processing Block (4) in parsing the digitized speech, as part of building the DSKQ(s).

According to some embodiments of the present invention, a speech act may not be satisfied by a single interaction (i.e. the analysis/processing of a single digitized speech, or otherwise obtained text, segment/stream signal) between user and system. According to some embodiments, based on results of a first interaction presented to a user, he or she may want to refine their request, thus entering a dialogue mode. Refinements of the results may involve anaphoric references to entities/terms introduced in previous steps of the dialogue. Accordingly, the Data/Command Discovery Block (5), upon reaching an equivocal query or content/data/command discovery result, may present to the user over a functionally associated computerized device, the temporary results reached and/or instructions/requests to provide (i.e. by further input) further details about his or her sought after content/data/command According to some embodiments, the content/data/command may, accordingly, be selected based on both the analysis/processing of the first text segment/stream and the analysis/processing of one or more additional text segment(s)/stream(s); wherein at least some of the one or more additional text segment(s)/stream(s) provide anaphoric references to entities/terms introduced in prior text segment(s)/stream(s), and wherein at least some of the entities/terms may be identified/understood using knowledgebases of the specific domain.

According to some embodiments of the present invention, the source of a text stream to be analyzed by the system may be other than speech. Accordingly, any natural language input source (e.g. a keyboard, an interfaced computerized device) may be used as the source from which a text stream, a corresponding structured query(ies) and/or a matching content(s)

are derived. According to some embodiments, a non-speech based system for language processing may render the Speech Acquisition Block (1) and the Speech Analytics Block (2) unnecessary, as the language provided to the system may already be in a text stream/segment format. Furthermore, it is hereby made clear that any combination of a 'speech based text' and a 'non-speech based text' system may likewise be utilized using the teachings provided herein, and that any such combination(s) fall(s) within the true spirit of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings:

In FIGS. 3A-3E there are shown, in accordance with some embodiments of the present invention, flow charts exemplifying the main steps executed as part of parsing and converting speech based, or otherwise obtained, text streams into structured queries, at least partially based on a domain specific knowledgebase;

DETAILED DESCRIPTION

Figure 1A:
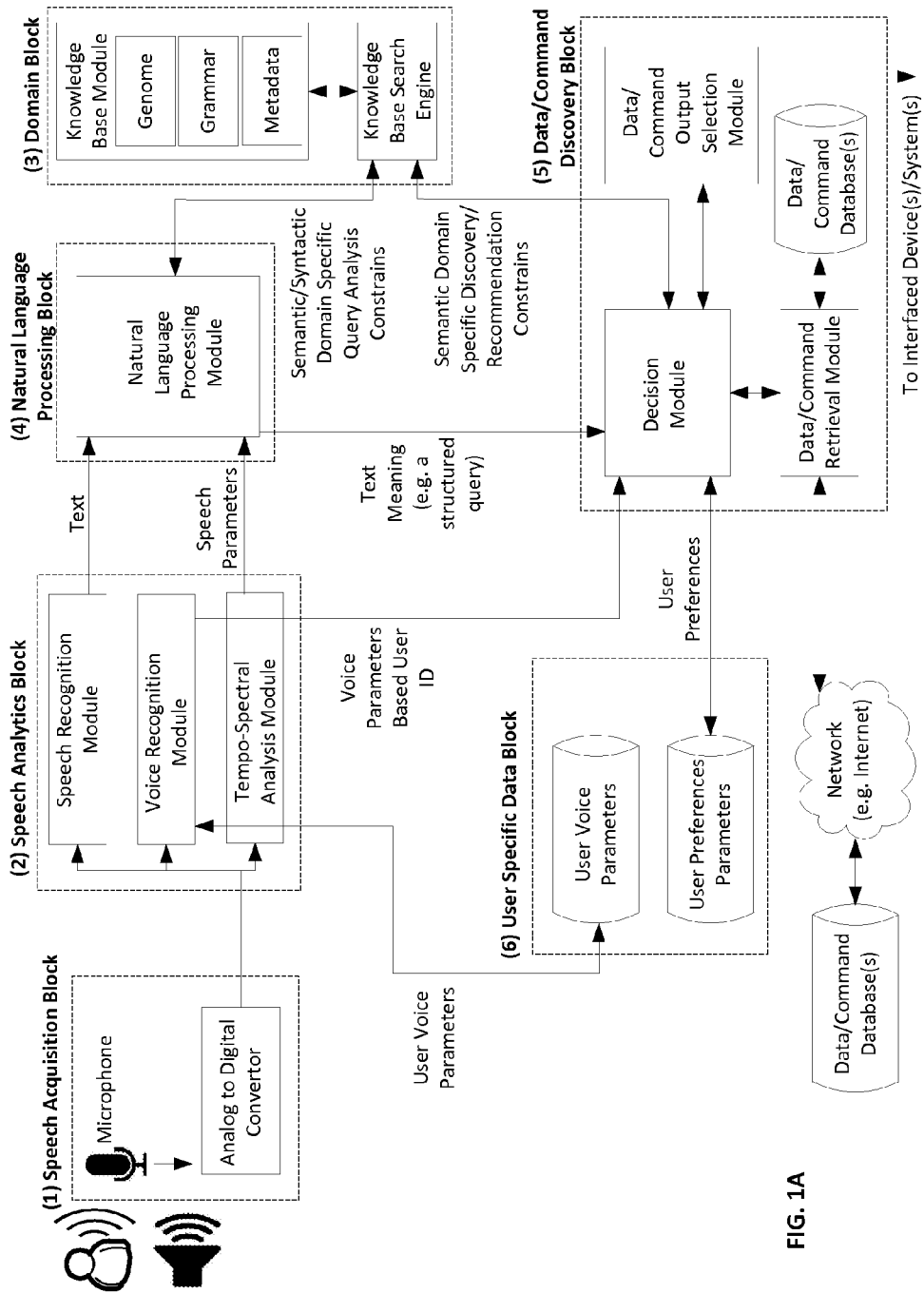
In FIG. 1A there is shown, in accordance with some embodiments of the present invention, a block diagram of an exemplary speech processing system for extrapolating meaning from vocalized speech.

In the following detailed description, numerous specific details are set forth in order to provide a thorough understanding of the invention. It will be understood by those skilled in the art, however, that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention includes methods, circuits, apparatuses, systems and associated computer executable codes for (natural) language processing of queries expressed in speech or in writing. According to some embodiments of the present invention, there is provided a language processing system for extrapolating meaning from vocalized speech, or otherwise provided free text or natural language, and discovering content, which system may comprise: (1) a Speech Acquisition Block (1) to sample and digitize vocalized speech of a user; (2) a Speech Analytics Block (2) to analyze the digitized speech, so as to recognize within the digitized speech samples a specific text stream; (3) a Domain Block (3) to utilize knowledgebases, in the context domain of the vocalized speech, or otherwise obtained text, to construct one or more semantic/syntactic domain specific query analysis constrains; and (4) a Natural Language Processing Block (4) to build, at least partially based on the domain specific query analysis constrains and/or general language syntax pertaining to requests, questions and instructions, a "Domain Specific Knowledgebase Query" (DSKQ) or set of queries. According to some embodiments, the language processing system may further comprise: (5) The Domain Block (3) to utilize knowledgebases, in the context domain of the vocalized speech, or otherwise obtained text, to construct one or more semantic domain specific discovery/recommendation constrains; and (6) a Data/Command Discovery Block (5) to find/select and output data/command(s)/content(s) at least partially based on: (a) the DSKQ(s), and/or (b) the semantic domain specific discovery/recommendation constrains.

According to some embodiments of the present invention, the system may further comprise: (7) a User Specific Data Block (6). The Speech Analytics Block (2) may identify the speaking user by referencing the User Specific Data Block (6) with digitized speech samples from the vocalized speech. According to some embodiments, the Data/Command Discovery Block (5), as part of selecting and outputting data/command(s)/content(s), may take into consideration prior preferences of the speaking user by referencing the User Specific Data Block (6) with the details of the identified speaking user. According to some embodiments of the present invention, the Speech Analytics Block (2) may derive Prosody information (e.g. tempo-spectral parameters) to assist the Natural Language Processing Block (4) in parsing the digitized speech, as part of building the DSKQ(s).

According to some embodiments of the present invention, a speech act may not be satisfied by a single interaction (i.e. the analysis/processing of a single digitized speech, or otherwise obtained text, segment/stream signal) between user and system. According to some embodiments, based on results of a first interaction presented to a user, he or she may want to refine their request, thus entering a dialogue mode. Refinements of the results may involve anaphoric references to entities/terms introduced in previous steps of the dialogue. Accordingly, the Data/Command Discovery Block (5), upon reaching an equivocal query or content/data/command discovery result, may present to the user over a functionally associated computerized device, the temporary results reached and/or instructions/requests to provide (i.e. by further input) further details about his or her sought after content/data/command According to some embodiments, the content/data/command may, accordingly, be selected based on both the analysis/processing of the first text segment/stream and the analysis/processing of one or more additional text segment(s)/stream(s); wherein at least some of the one or more additional text segment(s)/stream(s) provide anaphoric references to entities/terms introduced in prior text segment(s)/stream(s), and wherein at least some of the entities/terms may be identified/understood using knowledgebases of the specific domain.

According to some embodiments of the present invention, the source of a text stream to be analyzed by the system may be other than speech. Accordingly, any natural language input source (e.g. a keyboard, an interfaced computerized device) may be used as the source from which a text stream, a corresponding structured query(ies) and/or a matching content(s) are derived. According to some embodiments, a non-speech based system for language processing may render the Speech Acquisition Block (1) and the Speech Analytics Block (2) unnecessary, as the language provided to the system may already be in a text stream/segment format. Furthermore, it is hereby made clear that any combination of a 'speech based text' and a 'non-speech based text' system may likewise be utilized using the teachings provided herein, and that any such combination(s) fall(s) within the true spirit of the present invention.

Speech Acquisition Block

According to some embodiments of the present invention, the Speech Acquisition Block (1) may comprise: a Microphone (10) to sample vocalized speech of a user; and an Analog to Digital Converter (11) to digitize the sampled vocalized speech. According to some embodiments, the digitized speech samples may be relayed to the Speech Analytics Block (2) for analysis.

Speech Analytics Block

According to some embodiments of the present invention, the Speech Analytics Block (2) may comprise: a Speech Recognition Module (20) to transcribe the relayed digitized speech samples into a text stream or segment(s); a Voice Recognition Module (21) to identify the speaking user by referencing a User Voice Parameters database (61) record of the User Specific Data Block (6), used for storing data indicative of previously identified digitized speech samples and their respective users' identification details, with digitized speech samples from the vocalized speech; and/or a Tempo-Spectral Analysis Module (22) to derive Prosody information (e.g. tempo-spectral parameters) such as, but in no way limited to, pause, intonation and stress related parameters, and to embed/aggregate/inject metadata indicative of the pause, intonation and stress related parameters into the speech transcribed text stream, prior to their relaying to the Natural Language Processing Block (4).

Domain Block

According to some embodiments of the present invention, the Domain Block (3) may comprise: a Knowledgebase Module (31) to store domain related knowledge such as, but in no way limited to: (a) domain related taxonomy of concepts (Genome) and vocabulary, (b) domain related Metadata consisting of names of people, places, titles, production years, etc., and/or (c) a Grammar formally describing specific syntactic structures, corresponding to the given domain; and a Knowledgebase Search Engine (32) to find domain related knowledge that is: (a) relevant to the analysis of the text stream/segment and the construction of a corresponding domain specific knowledgebase query, and/or (b) relevant to the discovery/selection of data/command(s)/content(s) requested/sought-after in the text stream/segment; and to accordingly construct: (a) one or more semantic/syntactic domain specific query analysis constrains, and/or (b) one or more semantic domain specific discovery/recommendation constrains. According to some embodiments, the query analysis constrains and/or the discovery/recommendation constrains may be relayed to the Natural Language Processing Block (4) and/or the Data/Command Discovery Block (5), respectively.

It is hereby made clear that multiple knowledge bases (e.g. pertaining to different content domains), or knowledge base modules, may co-exist within the domain block; alternatively, multiple knowledge bases, or knowledge base modules, may co-exist within multiple domain blocks. Furthermore, according to some embodiments, knowledge base(s) may be proprietary, and/or may belong to an affiliate or any other third party entity.

Natural Language Processing Block

According to some embodiments of the present invention, the Natural Language Processing Block (4) may comprise: a Natural Language Processing Module/Engine (41) having Parsing/Query-Analysis Logic (42) to convert the speech transcribed, or otherwise obtained, text stream/segment relayed by the Speech Analysis Block (2), which optionally is Prosody information parameters embedded, into a "Domain Specific Knowledgebase Query" (DSKQ) or set of queries. Conversion of the text stream/segment into one or more structured queries may include the use of both syntactic and semantic analysis. More specifically, the text stream/segment may be processed using the Parsing/Query-Analysis Logic which may be configured for or constrained by "Domain Specific Query Analysis Constrains" (Domain Specific Query Generation Rule set" (DQGR)), which constrains/rule-set may also be referred to as a domain specific grammar. The DQGR may include, but is in no way limited to, rules relating to: (a) vocabulary, (b) specific syntactic structures corresponding to the given domain, (c) names of people, places, titles, and other metadata and/or (d) general expressions in the language pertaining to requests, questions and instructions.

According to some embodiments of the present invention, The Natural Language Processing Module/Engine (41) may also utilize a parser that converts a text stream/segment to a parser tree, based on which the DSKQ is generated. If parsing of a query against the given domain-specific grammar is incomplete, the Natural Language Processing Module/Engine (41) may apply heuristics to extract the maximum possible partial structures. The Natural Language Processing Module/Engine (41) may also apply dynamic loading or generation of lexical entries based on domain-specific metadata and terms appearing in a query. Additional functions may be included to discard syntactically-valid interpretations that do not make sense in the context of the given DSKQ and to prioritize alternative interpretations in case of an ambiguous input stream.

According to some embodiments of the present invention, The Natural Language Processing Module/Engine (41) may also utilize embedded Prosody information speech parameters and/or other information indicating the received text's syntactic structure, as part of a decision making process for text interpretation and generation of structured queries to the knowledge base. According to some embodiments, the one or more structured queries (DSKQs) may be relayed to the Data/Command Discovery Block (5).

Data/Command Discovery Block

According to some embodiments of the present invention, the Data/Command Discovery Block (5) may comprise: a Decision Module (51) to discover/find/select data/command(s)/content(s) in one or more associated and/or networked Data/Command Database(s) (70, 71) using a functionally associated Data/Command Retrieval Module (52). The data/command(s)/content(s) may be discovered/found/selected at least partially based on: (a) the one or more structured queries (DSKQs) relayed by the Natural Language Processing Block (4); (b) the one or more semantic domain specific discovery/recommendation (e.g. model/genome/taxonomy based) constrains/rule-set relayed by the Domain Block (3); and/or (c) user preferences obtained by referencing a User Preferences Parameters database (62) record, of the User Specific Data Block (6), using identification details of the speaking user as relayed by the Voice Recognition Module (21). According to some embodiments, a Data/Command Output Selection Module (53) may relay the discovered/found/selected data/command(s)/content(s) to interfaced, networked, communicated, and/or otherwise functionally associated system(s), device(s) and/or apparatus(es).

User Specific Data Block

According to some embodiments of the present invention, the User Specific Data Block (6) may comprise: the User Voice Parameters database (61) record that may be queried by the Voice Recognition Module (21) for correlating digitized speech samples to their users' identification details; and the User Preferences Parameters database (62) record that may be queried by the Decision Module (51) for correlating users' identification details to their data/command(s)/content(s) preferences. According to some embodiments, the User Specific Data Block (6) may be implemented in the form of two logically distinct databases, as described above, as a single database, and/or as any number of local, remote, centralized, distributed, proprietary and/or non-proprietary database(s), which is/are functionally associated with the invention system.

In FIG. 1A there is shown, in accordance with some embodiments of the present invention, a block diagram of an exemplary speech processing system for extrapolating meaning from vocalized speech, comprising: (1) a Speech Acquisition Block (1) to sample and digitize vocalized speech of a user; (2) a Speech Analytics Block (2) to analyze the digitized speech so as to recognize within the digitized speech samples a specific text stream; (3) a Domain Block (3) to utilize knowledgebase, in the context domain of the vocalized speech, to construct one or more semantic/syntactic domain specific query analysis constrains; and (4) a Natural Language Processing Block (4) to build, at least partially based on the domain specific query analysis constrains, a "Domain Specific Knowledgebase Query" (DSKQ) or set of queries. The speech processing system further comprises: (5) The Domain Block (3) to utilize knowledgebases, in the context domain of the vocalized speech, to construct one or more semantic domain specific discovery/recommendation constrains; (6) a Data/Command Discovery Block (5) to find/select and output data/command(s)/content(s) at least partially based on: (a) the DSKQ(s), and/or (b) the semantic domain specific discovery/recommendation constrains; and (7) a User Specific Data Block (6) for storing users' voice parameters and users' preferences parameters.

Figure 1B:
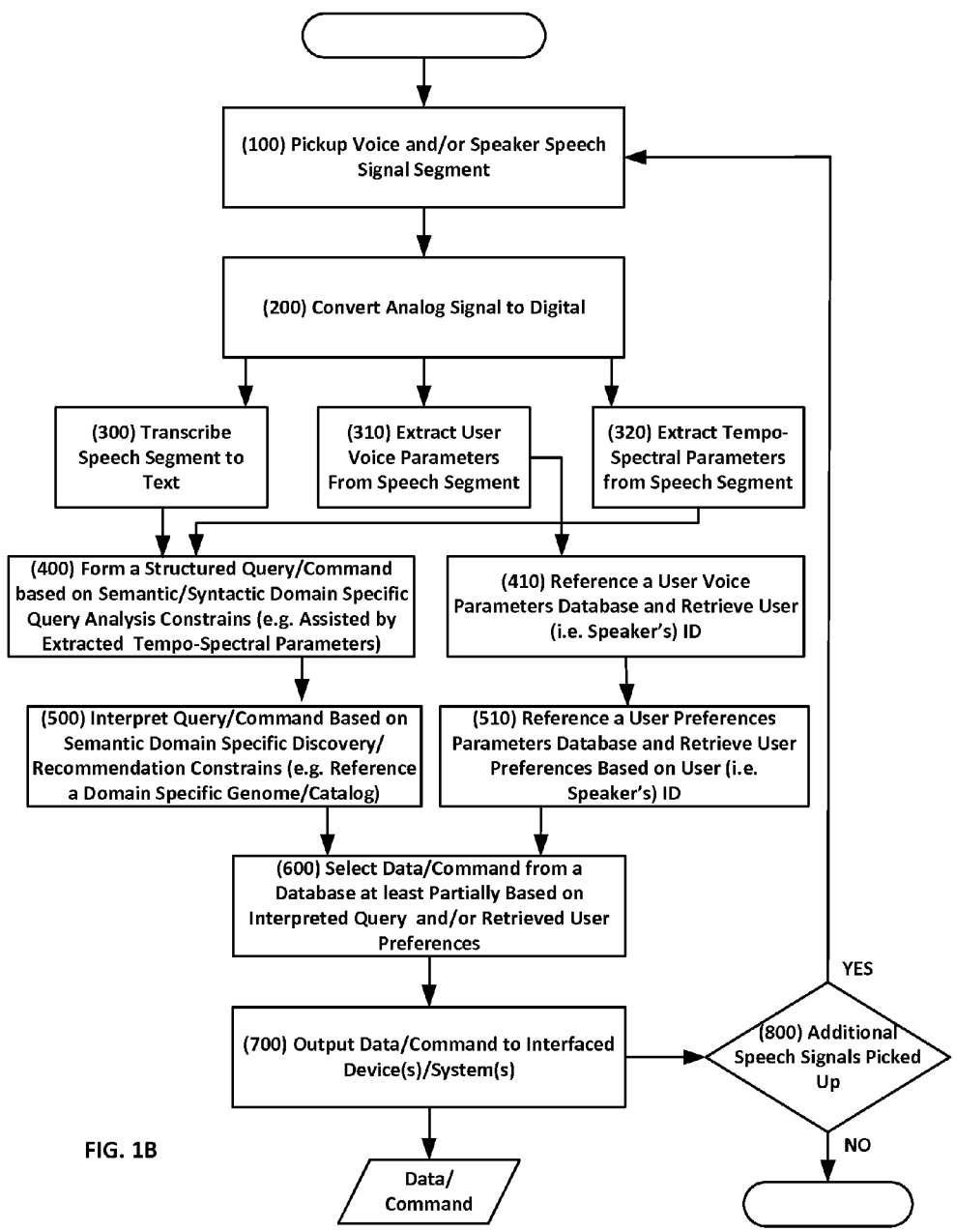
In FIG. 1B there is shown, in accordance with some embodiments of the present invention, a flow chart showing the steps of an exemplary speech processing method for extrapolating meaning from vocalized speech.

In FIG. 1B there is shown, in accordance with some embodiments of the present invention, a flow chart showing the steps of an exemplary speech processing method for extrapolating meaning from vocalized speech, comprising: (100), (200) Picking up (e.g. sampling) and converting to a digital signal(s) (e.g. digitizing) a voice and/or speaker speech signal stream/segment; (300) Transcribing the digitized speech stream/segment to text; (310) Extracting user voice parameters from the speech stream/segment; (320) Extracting tempo-spectral parameters from the speech stream/segment; (400) Forming a structured query/command based on: semantic and/or syntactic domain specific query analysis constrains, and the assistance of the extracted tempo-spectral parameters; (410) Referencing a user voice parameters database, with the extracted user voice parameters, and retrieving the ID information of the speaking user from which the speech stream/segment has originated; (500) Interpreting the query/command based on semantic domain specific discovery/recommendation constrains (e.g. referencing of a domain specific genome/catalog); (510) Referencing a user preferences parameters database, with the retrieved ID information of the speaking user from which the speech stream/segment has originated, and retrieving the user's preferences; (600) Selecting data/command(s)/content(s) from a database(s) at least partially based on: the interpreted query and/or the retrieved user preferences; (700) Outputting the selected data/command(s)/content(s) to Interfaced device(s)/system(s); and (800) Checking whether additional speech signals are being picked-up/sampled and if so starting a new iteration of the steps for the additional signals.

Figure 2A:
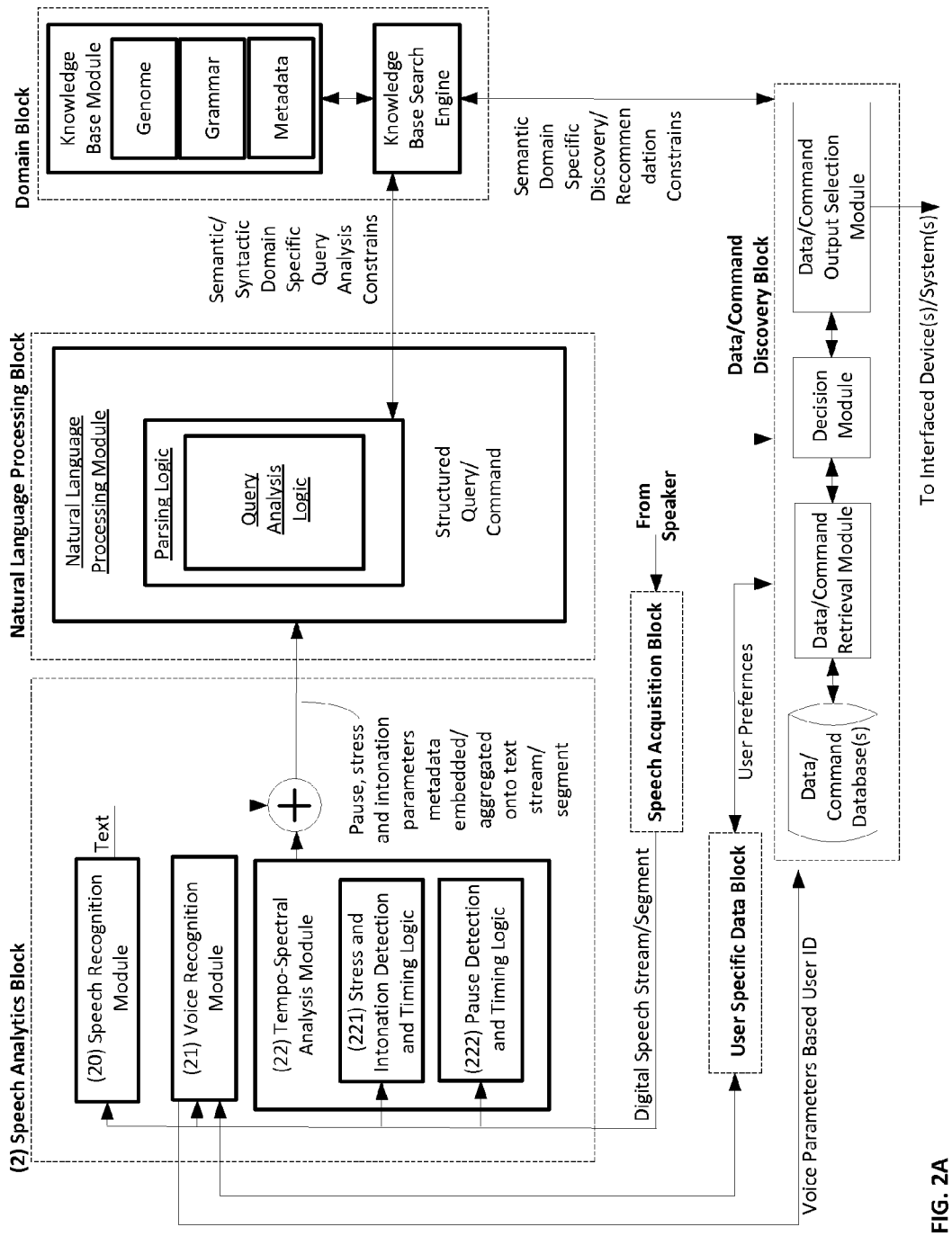
In FIG. 2A there is shown, in accordance with some embodiments of the present invention, a block diagram of an exemplary speech processing system for extrapolating meaning from vocalized speech, wherein the Speech Analytics Block is shown in further detail.

In FIG. 2A there is shown, in accordance with some embodiments of the present invention, a block diagram of an exemplary speech processing system for extrapolating meaning from vocalized speech, wherein the Speech Analytics Block (2), is shown in further detail. The Speech Analytics Block (2) comprises: the Speech Recognition Module (20) for transcribing to text the digital speech stream signal; the Voice Recognition Module (21) for a obtaining the identification information based on user voice parameters derived from the digital speech stream signal; and the Tempo-Spectral Analysis Module (22), comprising: Stress and Intonation Detection and Timing Logic (221) for identifying and characterizing stressed and/or intonated speech spots/segments (e.g. words, syllables, letters) in the digital speech stream signal, and Pause Detection and Timing Logic (222) for identifying and characterizing pauses between various speech parts/blocks (e.g. words, syllables, letters) in the digital speech stream signal. The Tempo-Spectral Analysis Module

(22) embeds the pause, stress and intonation identifying and characterizing parameters metadata onto the transcribed text stream/segment.

Figure 2B:
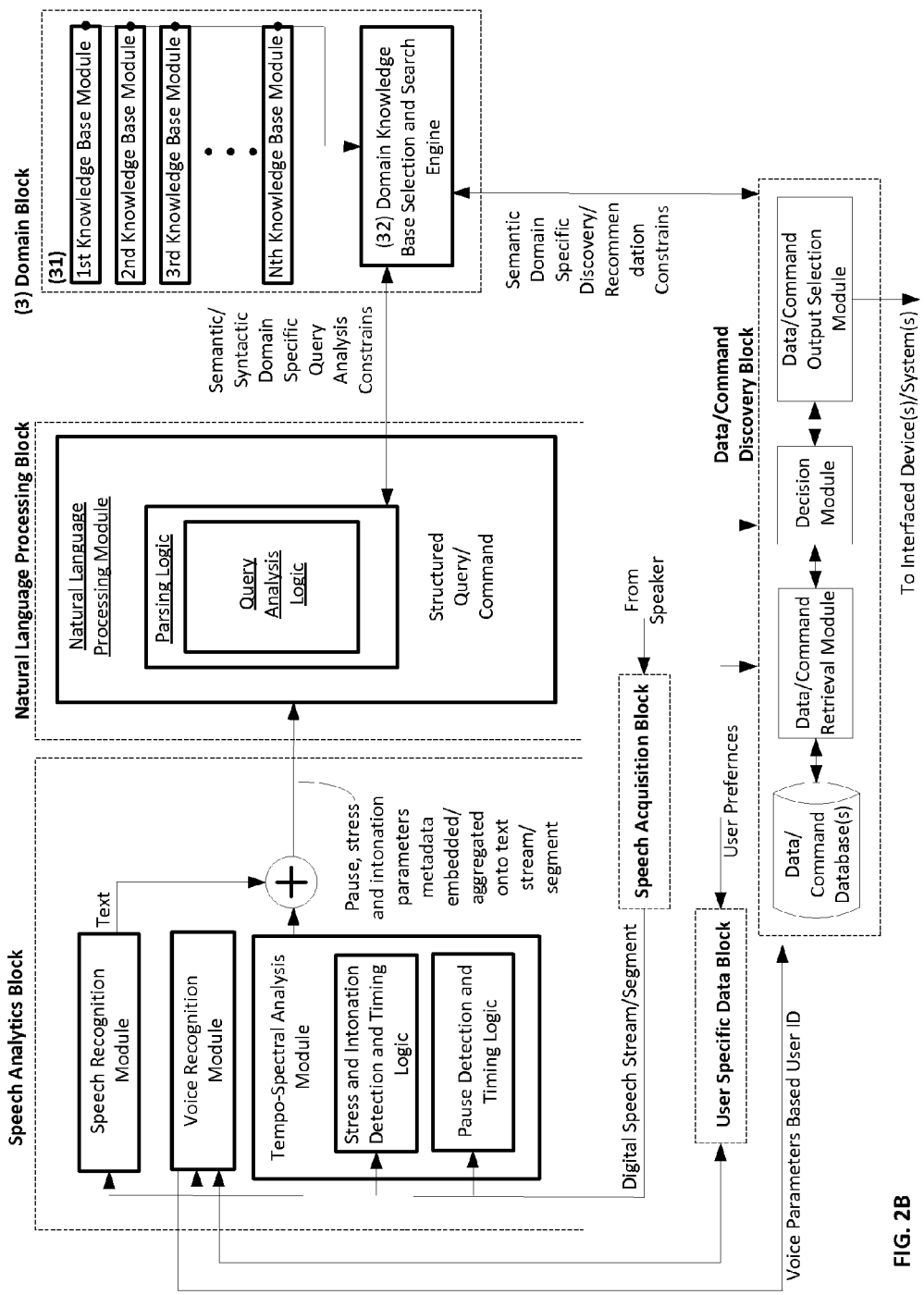
In FIG. 2B there is shown, in accordance with some embodiments of the present invention, a block diagram of an exemplary speech processing system for extrapolating meaning from vocalized speech, wherein the Domain Block comprises multiple Knowledgebase Modules.

In FIG. 2B there is shown, in accordance with some embodiments of the present invention, a block diagram of an exemplary speech processing system for extrapolating meaning from vocalized speech, wherein the Domain Block (3), comprises multiple [1st, 2nd, 3rd, Nth] Knowledgebase Modules (31). The Knowledgebase Search Engine (32)—prior to finding domain related knowledge that is: (a) relevant to the analysis of the text stream/segment and the construction of a corresponding domain specific knowledgebase query, and/or (b) relevant to the discovery/selection of data/command(s)/content(s) requested/sought-after in the text stream/segment—may select the knowledgebase that matches the domain in which it is interested. The domain and/or the knowledgebase selection may be explicitly made by the user/speaker and communicated (e.g. "I am interested in a book . . ." Hence, a 'books knowledgebase' is selected/referenced) and/or may be derived/understood from a general user/speaker request (e.g. "I want to read 'EndWar'" Hence, a 'books knowledgebase' is selected/referenced looking for Tom Clancy's book named 'EndWar' rather than a 'video game knowledgebase' in which 'EndWar' is a popular videogame by 'Ubisoft').

In FIGS. 3A-3E there are shown, in accordance with some embodiments of the present invention, flow charts exemplifying the main steps executed as part of parsing and converting speech based text streams into structured queries, at least partially based on a domain specific knowledgebase; made by an exemplary speech processing system for extrapolating meaning from vocalized speech.

In FIG. 3A there is shown, in accordance with some embodiments, an exemplary syntax and semantics based query analysis and content/data discovery process (i.e. the parsing and converting of a speech based text stream/segment into a structured query and/or the utilization of the query for finding matching content/data in a database) wherein: (a) Syntactic considerations (i.e. grammar rules) allow making differentiations between repeating appearances of the same word in the text; (b) Statistical considerations allow favoring a certain word, words, and/or associations rather than others; (c) Temporal knowledge allows converting verbal definitions of temporal points/periods into specific hours/dates; and (d) Semantic tagging of content allows the discovery of data/content that is associated to the type of data/content towards which the user expressed interest in his speech based text stream/segment.

In FIG. 3B there are shown, in accordance with some embodiments, exemplary, ambiguity handling, query analysis and content/data discovery processes (i.e. the parsing and converting of a speech based text stream/segment into a structured query and/or the utilization of the query for finding matching content/data in a database) wherein words, word combinations and/or associated words, known in the domain or having a domain specific/relevant meaning, are taken into consideration as part of the parsing process of the speech based text stream/segment.

In FIG. 3C there is shown, in accordance with some embodiments, an exemplary, complex concepts' understanding based, query analysis and content/data discovery process (i.e. the parsing and converting of a speech based text stream/segment into a structured query and/or the utilization of the query for finding matching content/data in a database) wherein: (a) Domain-specific genome terms are translated into Boolean combinations of these terms; and (b) One or more characteristics of sought after content/data are derived from Domain-specific genome terms or from terms having a domain specific/relevant meaning.

In FIG. 3D there is shown, in accordance with some embodiments, an exemplary, content characteristics and syntax based, query analysis and content/data discovery process (i.e. the parsing and converting of a speech based text stream/segment into a structured query and/or the utilization of the query for finding matching content/data in a database) wherein: (a) Words, word combinations and/or associated words, known in the domain or having a domain specific/relevant meaning, are taken into consideration as part of the parsing process of the speech based text stream/segment; (b) Domain-specific genre is identified; (c) Result set is negated; (d) roles of word(s) are syntactically identified; and (e) A content similarity/distance function that assists the identification of the intended meanings of word(s) and/or its/their coupling to certain other words or terms.

In FIG. 3E there are shown, in accordance with some embodiments, exemplary, prosody information assisted, query analysis and content/data discovery processes (i.e. the parsing and converting of a speech based text stream/segment into a structured query and/or the utilization of the query for finding matching content/data in a database) wherein the logical structure and/or the parsing decisions of the speech based text stream/segment are at least partially made based on pause, stress and/or intonation speech parameters.

Figure 4:
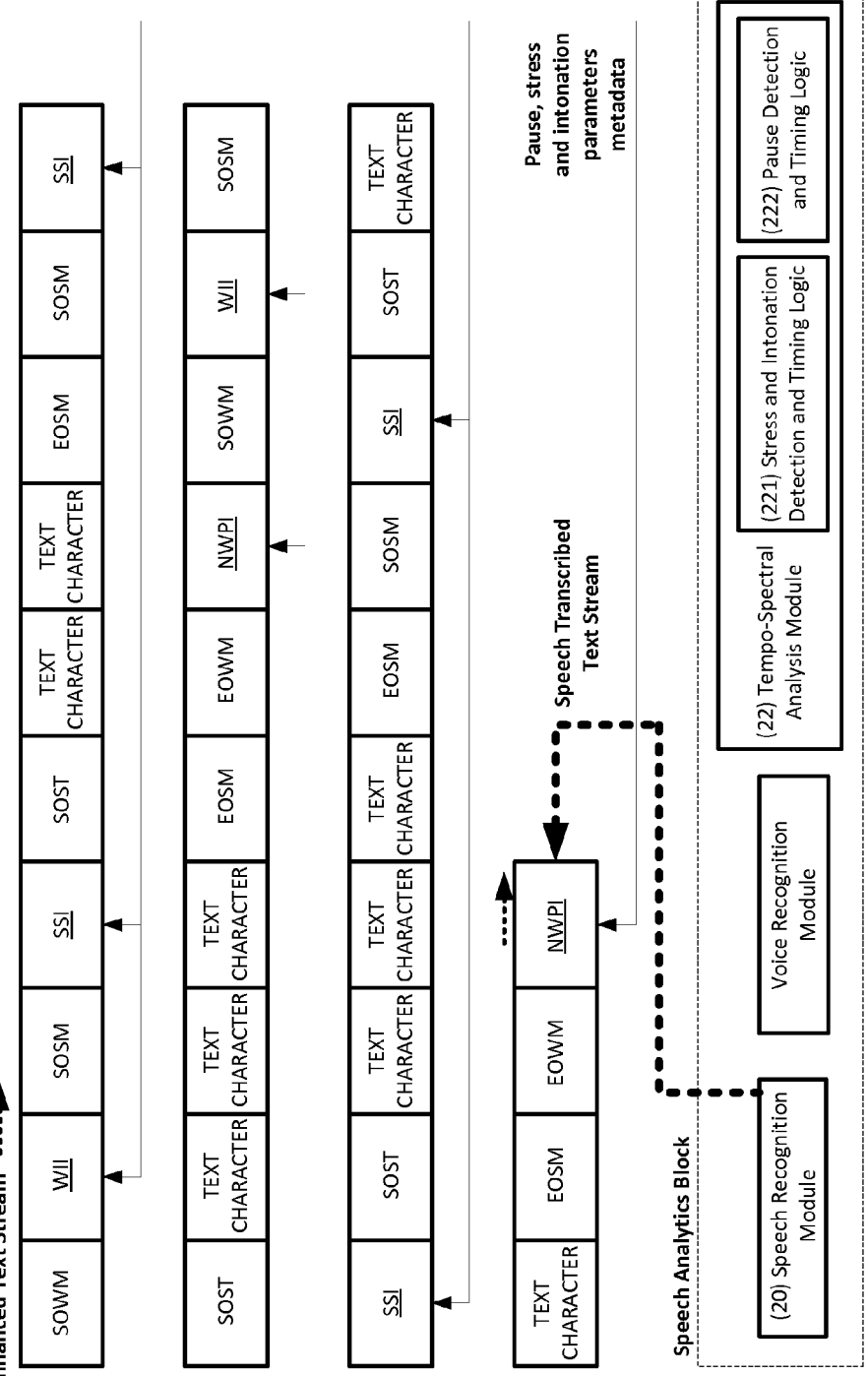
In FIG. 4 there is shown, in accordance with some embodiments of the present invention, a diagram of an exemplary enhanced text stream embedded/injected with speech pause, stress and intonation parameters metadata; and In FIG. 5A-5B there are shown, in accordance with some embodiments of the present invention, flow charts exemplifying the main steps executed as part of parsing and converting speech based or otherwise obtained text streams, from multiple interactions, into structured queries.

In FIG. 4 there is shown, in accordance with some embodiments of the present invention, a diagram of an exemplary enhanced text stream. A digital speech stream/segment, transcribed to text by the Speech Recognition Module (20), is embedded/injected with speech pause, stress and intonation parameters metadata by the Tempo-Spectral Analysis Module (22). In this example, stressed and/or intonated speech parts/segments identified and characterized by the Stress and Intonation Detection and Timing Logic (221), and/or pauses between various speech parts/segments identified and characterized by the Pause Detection and Timing Logic (222); are embedded/injected into corresponding spots—before, after or between text characters (e.g. bits containing text characters) of actual words, syllables and/or letters—to generate the enhanced, prosody parameters containing, text stream.

Figure 5A:
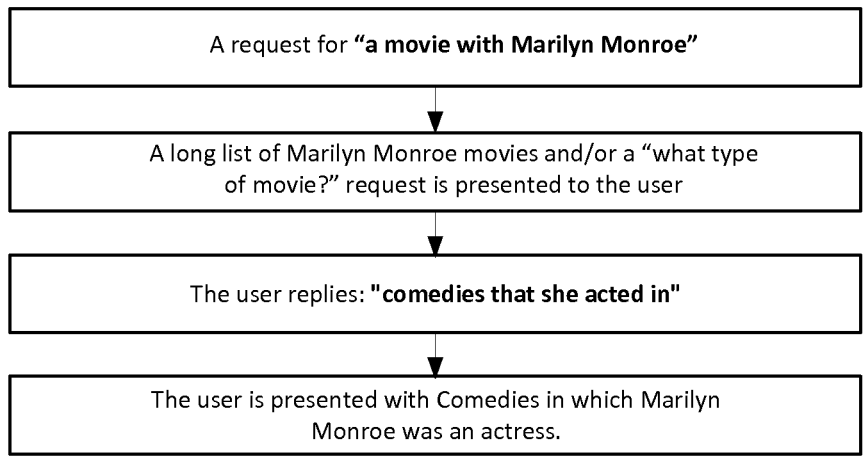
Figure 5B:
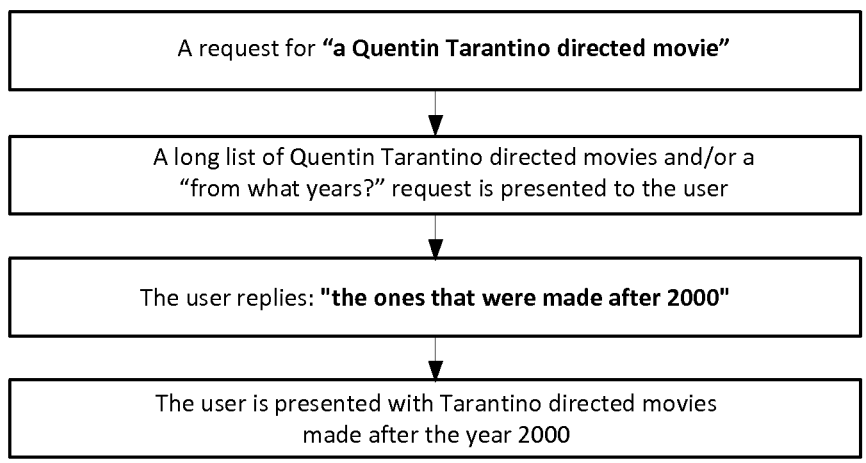

In FIG. 5A-5B there are shown, in accordance with some embodiments of the present invention, flow charts exemplifying the main steps executed as part of parsing and converting speech based text streams, from multiple speech interactions, into structured queries; made by an exemplary speech processing system for extrapolating meaning from vocalized speech.

In FIG. 5A there is shown, in accordance with some embodiments, an exemplary query analysis and content/data discovery process (i.e. the parsing and converting of a speech based text stream/segment into a structured query and/or the utilization of the query for finding matching content/data in a database) wherein: a user request for a certain content genre (comedy), in an additional digitized speech segment/stream is interpreted in light of his prior request for a certain content related entity/person (actress Marilyn Monroe) in a first digitized speech segment/stream. Thus, as a final result, the user is presented with Comedies in which Marilyn Monroe was an actress.

In FIG. 5B there is shown, in accordance with some embodiments, an exemplary query analysis and content/data discovery process (i.e. the parsing and converting of a speech based text stream/segment into a structured query and/or the utilization of the query for finding matching content/data in a database) wherein: a user request for a certain content related date (made after 2000), in an additional text segment/stream, is interpreted in light of his prior request for a certain content related entity/person (director Quentin Tarantino) in a first text segment/stream. Thus, as a final result, the user is presented with Tarantino directed movies made after the year 2000.

The subject matter described above is provided by way of illustration only and should not be constructed as limiting. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A language understanding system for extrapolating meaning from vocalized speech comprising:
   a Speech Acquisition Block to sample vocalized speech of a speaking user and to generate a corresponding digitized speech data of the speaking user;
   a Speech Analytics Block to analyze the digitized speech data so as to recognize a specific text stream;
   a Domain Block to utilize a knowledgebase including grammar formally describing specific syntactic structures corresponding to a specific context domain of the vocalized speech, to construct a syntactic domain specific query analysis rule-set; and
   a Natural Language Processing Block to build, at least partially based on the domain specific query analysis rule-set, a Domain Specific Knowledgebase Query (DSKQ) or set of queries.

2. The language understanding system of claim 1 wherein:
   the Domain Block is further adapted to utilize a knowledgebase, in the context domain of the vocalized speech, to construct a semantic domain specific content discovery rule-set; and wherein the system further comprises:
   a Data Discovery Block to find and output content(s) at least partially based on: (a) the DSKQ(s), or (b) the semantic domain specific discovery rule-set.

3. The language understanding system of claim 2 wherein:
   the Speech Analytics Block further comprises a Voice Recognition Module to identify the speaking user by referencing a User Specific Data Block with digitized speech samples from the vocalized speech and relaying identification details of the identified speaking user to the Data Discovery Block, and wherein
   said Data Discovery Block, as part of finding and outputting content(s), takes into consideration prior preferences of the speaking user by referencing said User Specific Data Block with the identification details of the identified speaking user.

4. The language understanding system of claim 2 wherein:
   the Domain Block comprises multiple Domain Specific Knowledgebase Modules, based on a semantic taxonomy also referred to as Genome.

5. The language understanding system of claim 4 wherein:
   one or more specific Domain Specific Knowledgebase Modules, out of the multiple Domain Specific Knowledgebase Modules in the Domain Block, are selected based on an explicit user request.

6. The language understanding system of claim 4 wherein:
   a specific Domain Specific Knowledgebase Module, out of the multiple Domain Specific Knowledgebase Modules in the Domain Block, is derived from a general user request.

7. The language understanding system of claim 2 wherein:
   the Data Discovery Block, upon reaching an equivocal query yielding a partial content discovery result, presents to the speaking user over a functionally associated computerized device, the partial content discovery result.

8. The language understanding system of claim 7 wherein:
   the Data Discovery Block further presents to the speaking user providing the vocalized speech sampled, with a request to provide additional vocalized speech for sampling, and wherein content is selected based on both: (a) analysis of the vocalized speech sampled, and (b) analysis of the additonal vocalized speech for sampling provided by the speaking user in response to the presented request and wherein at least some of the additional vocalized speech for sampling provides anaphoric references to terms introduced in priorly sampled vocalized speech.

9. The language understanding system of claim 1 wherein:
   the natural language processing block is further adapted to express the grammar formally describing specific syntactic structures corresponding to the specific context domain of the vocalized speech as a domain specific rule set, utilizable by a parsing logic to parse language in that specific context domain; and
   wherein said parsing logic is adapted for dynamic loading of lexical entries and metadata variables and recovery of partial structures from failed or incomplete parses.

10. A language understanding system for extrapolating meaning from natural language comprising:
    a Domain Block to utilize a knowledgebase at least partially including grammar formally describing specific syntactic structures corresponding to a specific context domain of the natural language, to construct a semantic or syntactic domain specific query analysis rule-set; and
    a Natural Language Processing Block to build, at least partially based on the domain specific query analysis rule-set, a Domain Specific Knowledgebase Query (DSKQ) or set of queries.

11. The language understanding system of claim 10 wherein:
    the Domain Block is further adapted to utilize a knowledgebase, in the context domain of the natural language, to construct a semantic domain specific discovery rule-set; and wherein the system further comprises:
    a Data Discovery Block to find and output content(s) at least partially based on: (a) the DSKQ(s), or (b) the semantic domain specific discovery rule-set.

12. The language understanding system of claim 11 wherein:
    the Data Discovery Block, upon reaching an equivocal query yielding a partial content discovery result, presents to the speaking user over a functionally associated computerized device, the partial content discovery result.

13. The language understanding system of claim 12 wherein:
    the Data Discovery Block further presents to the speaking user with request to provide by further speech further details about his sought after content.

14. The language understanding system of claim 10 wherein:
    the Domain Block comprises multiple Domain Specific Knowledgebase Modules, based on a semantic taxonomy also referred to as Genome.

15. The language understanding system of claim 14 wherein:
    one or more specific Domain Specific Knowledgebase Modules, out of the multiple Domain Specific Knowledgebase Modules in the Domain Block, are selected based on an explicit user request.

16. The language understanding system of claim 14 wherein:
    a specific Domain Specific Knowledgebase Module, out of the multiple Domain Specific Knowledgebase Modules in the Domain Block, is derived from a general user request.

17. A method for language understanding and extrapolating meaning from natural language comprising:
    utilizing a knowledgebase including grammar formally describing specific syntactic structures corresponding to a specific context domain of the natural language, to construct a semantic or syntactic domain specific query analysis rule-set; and
    building, at least partially based on the domain specific query analysis rule-set, a Domain Specific Knowledgebase Query (DSKQ) or set of queries.

18. The method of claim 17 further comprising:
    utilizing a knowledgebase, in the context domain of the natural language, to construct one or more semantic domain specific discovery rule-sets;
    finding content(s) at least partially based on: (a) the DSKQ(s), or (b) the semantic domain specific discovery/recommendation rule-sets; and
    outputting the found content(s).

19. A language understanding system for extrapolating meaning from vocalized speech comprising:
    a Speech Acquisition Block to sample vocalized speech of a speaking user and to generate a corresponding digitized speech data of the speaking user;
    a Speech Analytics Block, including Tempo-Spectral Analysis capability to analyze the digitized speech data so as to recognize a specific text stream, derive Prosody information from the specific text stream, and embed metadata indicative of the derived Prosody information into the specific text stream; and
    a Natural Language Processing Block to build, at least partially based on the metadata embedded specific text stream, a Domain Specific Knowledgebase Query (DSKQ) or set of queries.

20. The language understanding system of claim 19 further comprising:
    a Domain Block to utilize a knowledgebase, in a specific context domain of the vocalized speech, to construct a semantic or syntactic domain specific query analysis rule-set; and
    wherein the Natural Language Processing Block is further adapted to build the Domain Specific Knowledgebase Query (DSKQ) or set of queries, at least partially based on the domain specific query analysis rule-set.

* * * * *